United States Patent
Chen et al.

[11] Patent Number: 6,154,568
[45] Date of Patent: *Nov. 28, 2000

[54] IMAGE PROCESSING APPARATUS FOR PROCESSING A BI-LEVEL IMAGE AND METHOD THEREFOR

[75] Inventors: Liming Chen; Osamu Asada, both of Tokyo, Japan

[73] Assignee: Oki Data Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/867,394

[22] Filed: Jun. 2, 1997

[30] Foreign Application Priority Data

Jun. 28, 1996 [JP] Japan ................... 8-169862

[51] Int. Cl.[7] ........................................ G06K 9/32
[52] U.S. Cl. ................ 382/232; 382/271; 382/298; 358/457; 358/298
[58] Field of Search .................. 382/232, 244–246, 382/297–300, 237, 272, 270, 169, 268–275; 358/451–455, 457, 298, 445, 426–433, 460, 530, 462, 1.2, 1.9; 395/102, 109; 345/439; 347/41; 348/390

[56] References Cited

U.S. PATENT DOCUMENTS

| | | | |
|---|---|---|---|
| 4,734,784 | 3/1988 | Tanaka | 358/426 |
| 4,783,838 | 11/1988 | Matsunawa | 382/271 |
| 4,814,886 | 3/1989 | Kuge et al. | 358/457 |
| 5,014,124 | 5/1991 | Fujisawa | 358/530 |
| 5,283,667 | 2/1994 | Kojima et al. | 358/462 |
| 5,299,028 | 3/1994 | Kwarta | 358/445 |
| 5,301,266 | 4/1994 | Kimura | 345/439 |
| 5,438,634 | 8/1995 | Kumagai | 382/169 |
| 5,568,199 | 10/1996 | Kajimoto et al. | 348/390 |
| 5,633,663 | 5/1997 | Matsubara et al. | 347/41 |

Primary Examiner—Leo H. Boudreau
Assistant Examiner—Ishrat Sherali
Attorney, Agent, or Firm—Rabin & Champagne PC

[57] ABSTRACT

A bi-level image is pre-processed by dividing the image into rectangular blocks, and rearranging the dots in each rectangular block into a pattern determined by the density of black dots in the block. The resulting rearranged image is suitable for further processing such as resolution conversion or compressive encoding.

9 Claims, 10 Drawing Sheets

IMAGE PROCESSING APPARATUS FOR PROCESSING A BI-LEVEL IMAGE AND METHOD THEREFOR

BACKGROUND OF THE INVENTION

The present invention relates to a bi-level image processing method and apparatus such as a method and apparatus for converting the resolution of a bi-level image, or for compressively encoding a bi-level image.

Although a bi-level image comprises only black and white dots, many bi-level images exploit the integrating capability of the human visual system to express different levels of gray by means of patterns in which black dots appear with different densities. These patterns are generated by linear interpolation and other well-known techniques, and the arrangement of black dots in the patterns is essentially random.

Random arrangements create problems in various types of image processing. As one of these problems, when the resolution of a bi-level image is converted, random arrangements of black dots tend to generate unwanted patterns, referred to as texture, in the converted image. As another problem, when the image is compressively encoded, the randomness of the dot patterns prevents high compression ratios from being attained.

SUMMARY OF THE INVENTION

A general object of the present invention is accordingly to increase the regularity of a bi-level image, thereby making the image more suitable for further image processing.

A more specific object is to convert the resolution of a bi-level image without generating unwanted texture.

Another more specific object is to increase the compression ratio when a bi-level is compressively encoded.

The invented method and apparatus begin by dividing a bi-level image into rectangular blocks, and rearranging the dots in each rectangular block into a pattern determined by the number of dots having a particular value in the rectangular block, thereby producing a rearranged image.

According to a first aspect of the invention, the resolution of the rearranged image is then converted to produce an output image.

According to a second aspect of the invention, the rearranged image is compressively encoded to obtain first coded data. These first coded data may be used as output data. The original bi-level image itself may also be encoded, however, to obtain second coded data, in which case the first coded data are selected for output if the second coded data exceed a certain threshold size, and the second coded data are selected for output if the second coded data do not exceed the threshold size.

DETAILED DESCRIPTION OF THE INVENTION

Embodiments of the invention will be described with reference to the attached illustrative drawings.

First Embodiment

The first embodiment is a resolution conversion device for converting the resolution of a bi-level image. This device can be usefully employed in a personal computer, for example, to convert image data from a first resolution to a second resolution, for transmission to a printer, facsimile machine, or other image output device having the second resolution.

Figure 1:
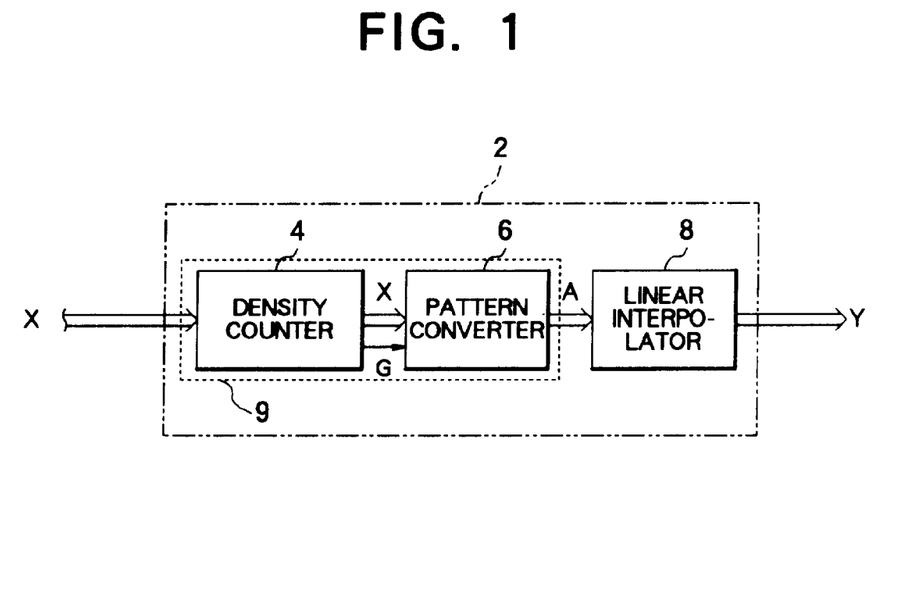
FIG. 1 is a block diagram of a first embodiment of the invention.
Figure 2:
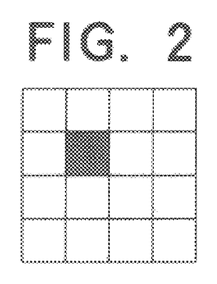
FIGS. 2, 3, 4, 5, 6, 7, 8, 9, 10, 11, 12, 13, 14, 15, and 16 illustrate dot patterns generated by the first embodiment.
Figure 3:
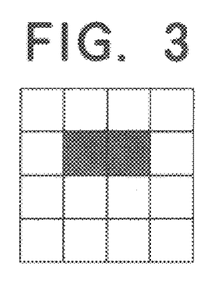
Figure 4:
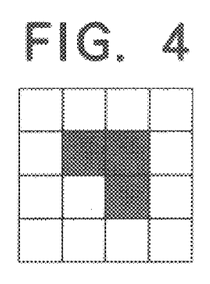
Figure 5:
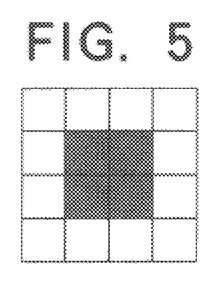
Figure 6:
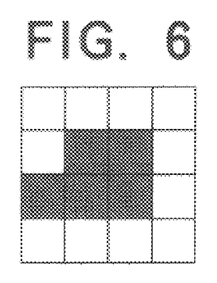
Figure 7:
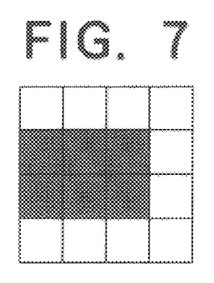
Figure 8:
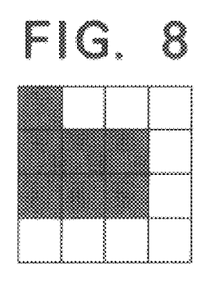
Figure 9:
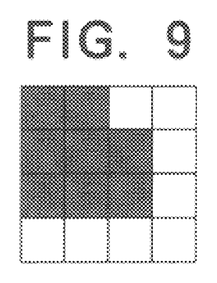
Figure 10:
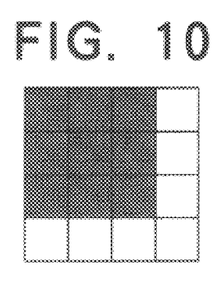
Figure 11:
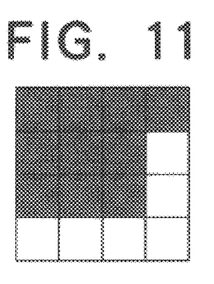
Figure 12:
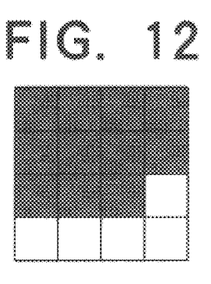
Figure 13:
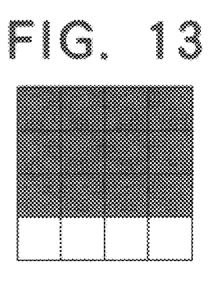
Figure 14:
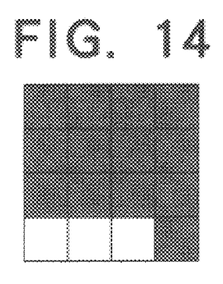
Figure 15:
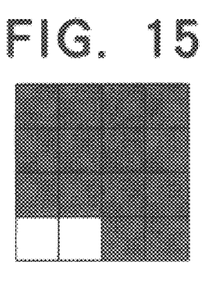
Figure 16:
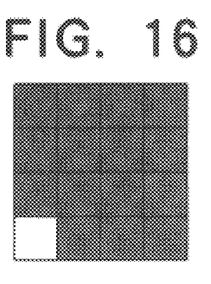

Referring to FIG. 1, the resolution conversion device 2 comprises a density counter 4, a pattern converter 6, and a linear interpolator 8. The density counter 4 and pattern converter 6 constitute an image regularizer 9.

The density counter 4 receives an input bi-level image X, divides the image X into rectangular blocks, and counts the number of black dots in each block, thus obtaining a density count G for each block. In the present embodiment, the rectangular blocks are four-by-four blocks; G therefore takes on values from zero to sixteen. If $d_i$ (i=1 to 16) are the bit values of the dots, and black dots are represented by bit values of '1, ' then G can be calculated by the following equation:

$$G = \sum_{i=1}^{16} d_i$$

The pattern converter 6 rearranges the dots in each block into a pattern determined solely by the value of G. The term "rearrange" is used herein in the usual sense, implying that the pattern converter 6 does not change the number of dots per block, or alter the number of black dots. The resulting rearranged image A, comprising the rearranged blocks, is provided to the linear interpolator 8.

The linear interpolator 8 uses a linear interpolation method to convert the resolution of the rearranged image A. Specifically, the linear interpolator 8 selects the dot in the rearranged image that is closest to each dot position in the converted image, and assigns the value of the selected dot to the converted dot. The resulting converted image Y is the output of the resolution conversion device 2.

Next, the operation of the pattern converter 6 will be described in more detail.

The pattern generated by the pattern converter 6 in each block is a spiral pattern of black dots that starts at a central dot in the block and continues for a number of dots equal to the value of G. The spiral always starts at the same central dot and always proceeds in the same direction. FIGS. 2 to 16 show the spiral patterns for density counts G from one to fifteen, when the starting dot is the upper left dot among the four central dots, and the pattern spirals clockwise.

Needless to say, for a density count of zero, the pattern converter 6 generates an all-white pattern, and for a density count of sixteen, the pattern converter 6 generates an all-black pattern.

Figure 17:
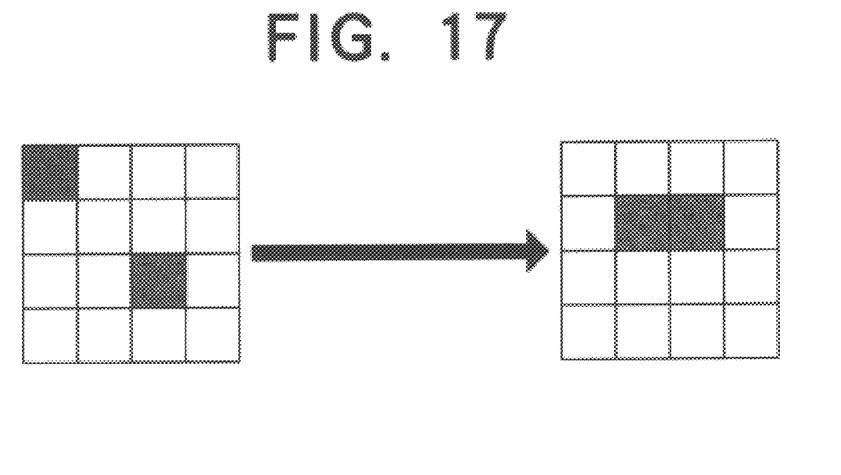
FIGS. 17, 18, and 19 illustrate dot rearrangement by the first embodiment.
Figure 18:
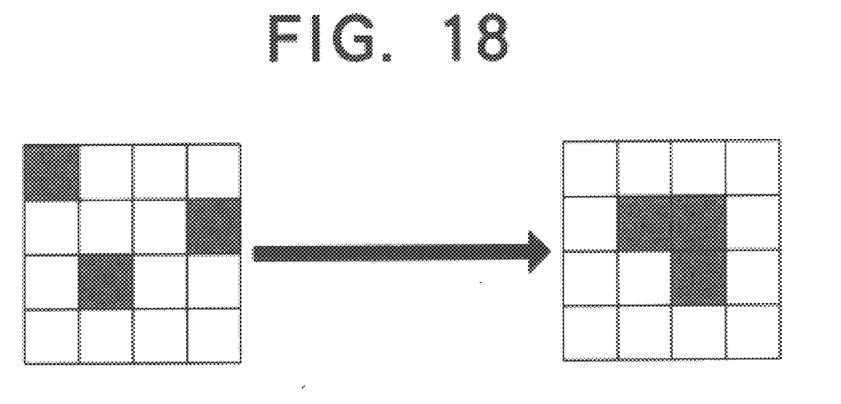
Figure 19:
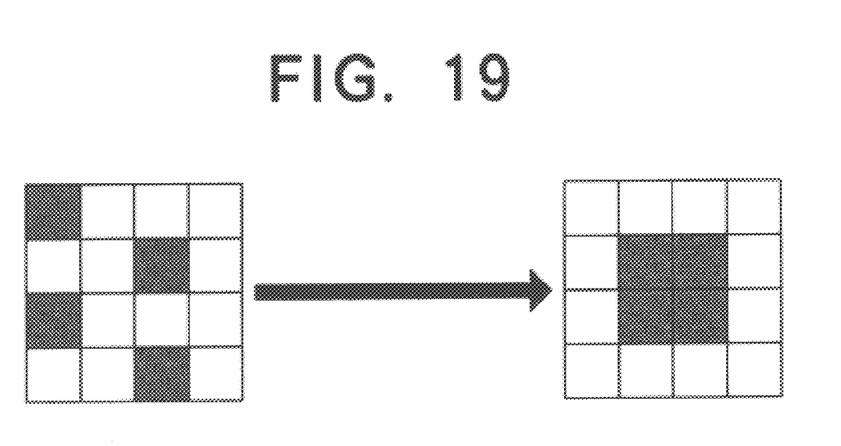

FIGS. 17, 18, and 19 illustrate the action of the pattern converter 6 on typical rectangular blocks having two, three, and four black dots, respectively. Regardless of the disposition of black dots in the input block, the pattern converter 6 converts the block to a fixed, regular output pattern in which the black dots are concentrated at the center of the block.

Figure 20:
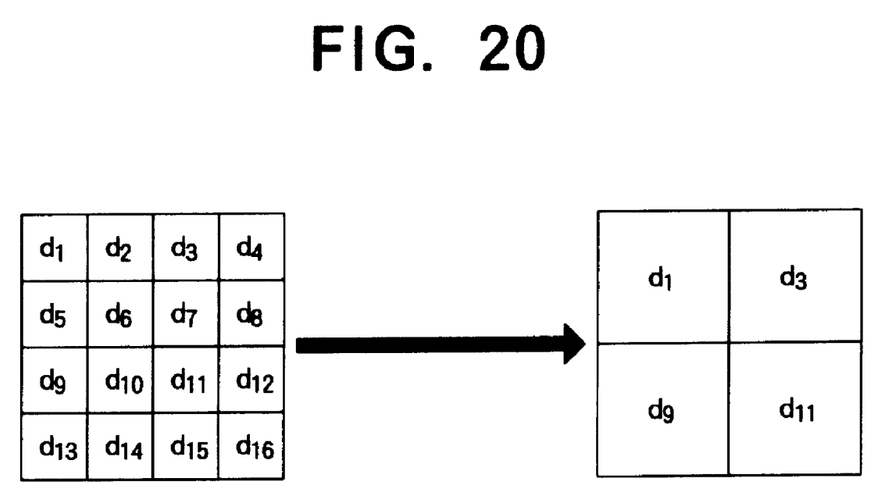
FIG. 20 illustrates resolution conversion in the first embodiment.

FIG. 20 illustrates the operation of the linear interpolator 8 when the resolution is reduced by a factor of two, so that each four-by-four block of dots is converted to a two-by-two block. The positions of the four dots in the two-by-two block are mapped onto the positions of dots $d_1$, $d_3$, $d_9$, and $d_{11}$ in the four-by-four block. The linear interpolator 8 copies the values of these dots $d_1$, $d_3$, $d_9$, and $d_{11}$ and discards the other dots.

Figure 21:
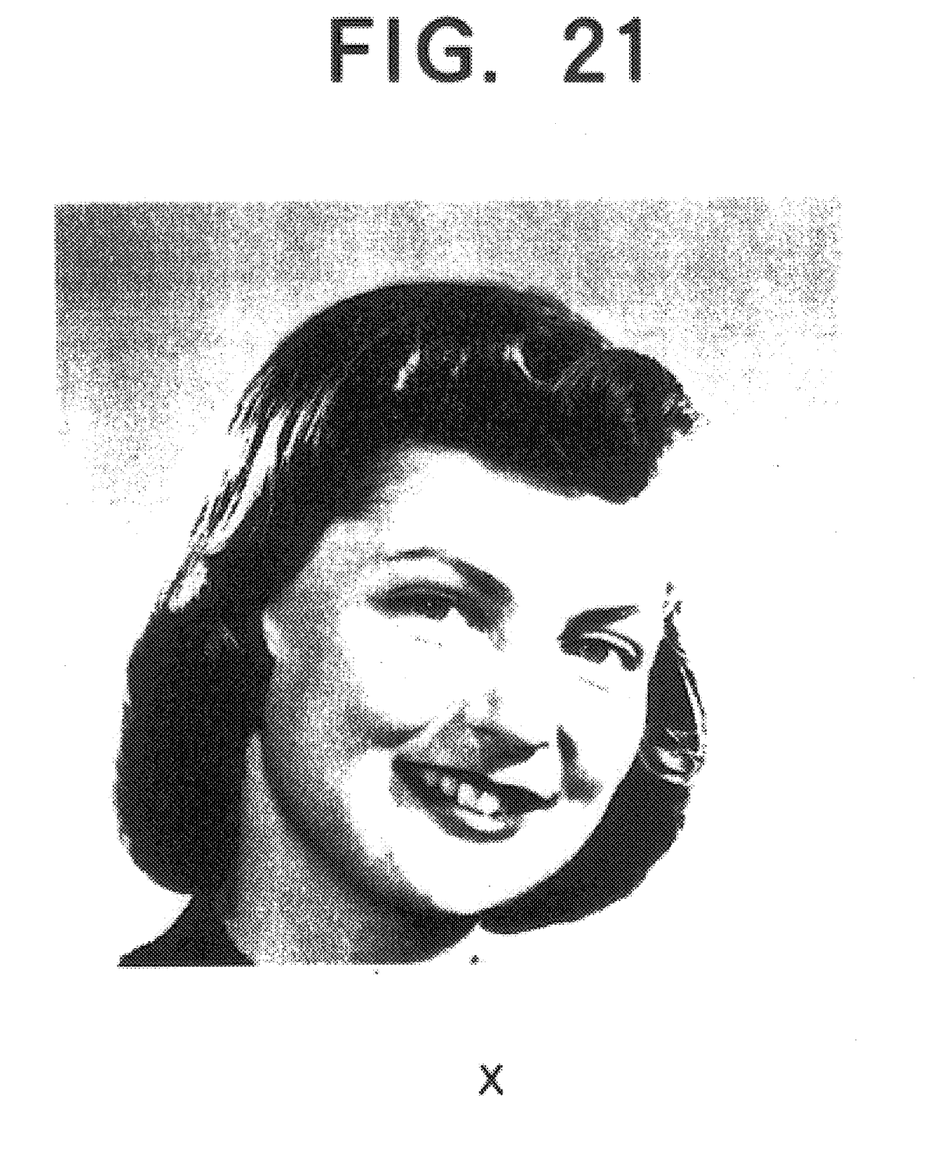
FIG. 21 is a bi-level image.
Figure 22:
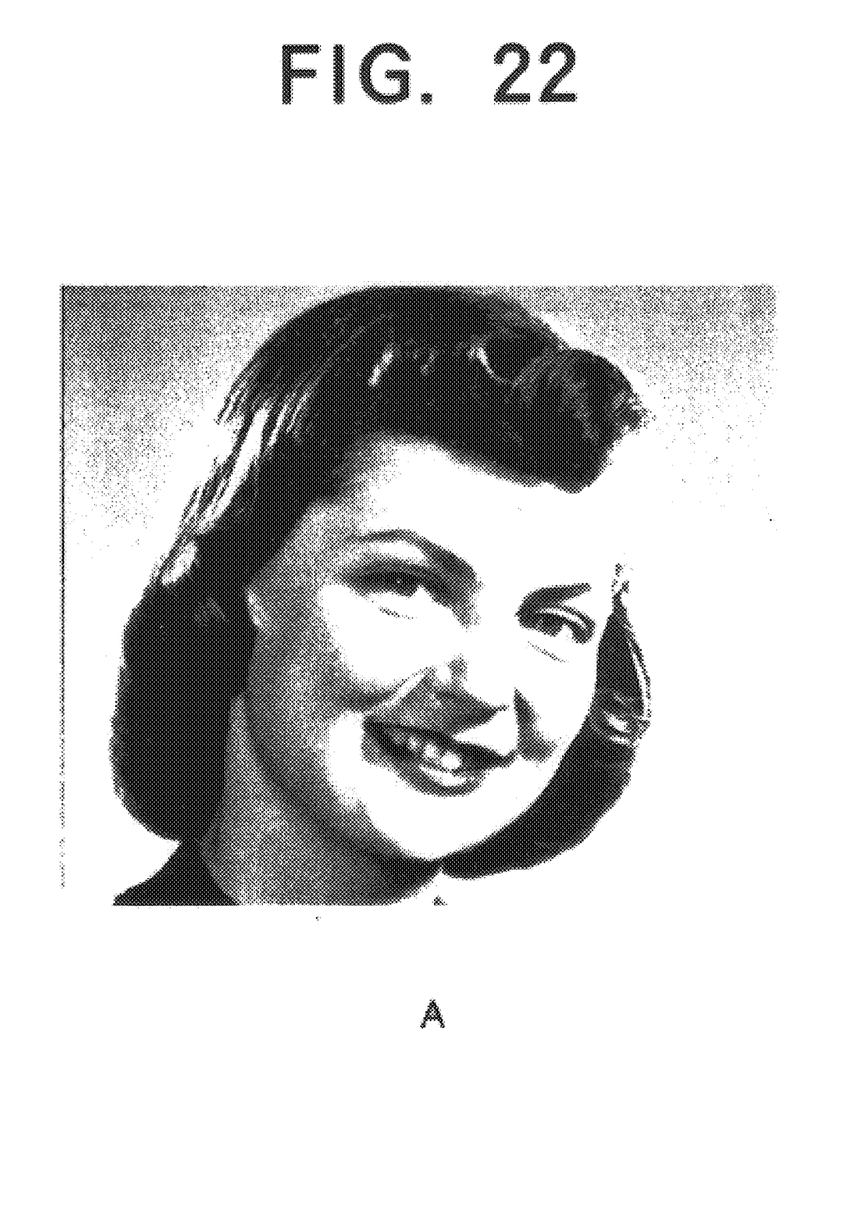
FIG. 22 is a rearranged image, obtained by the first embodiment by rearranging dots in the bi-level image in FIG. 21.
Figure 23:
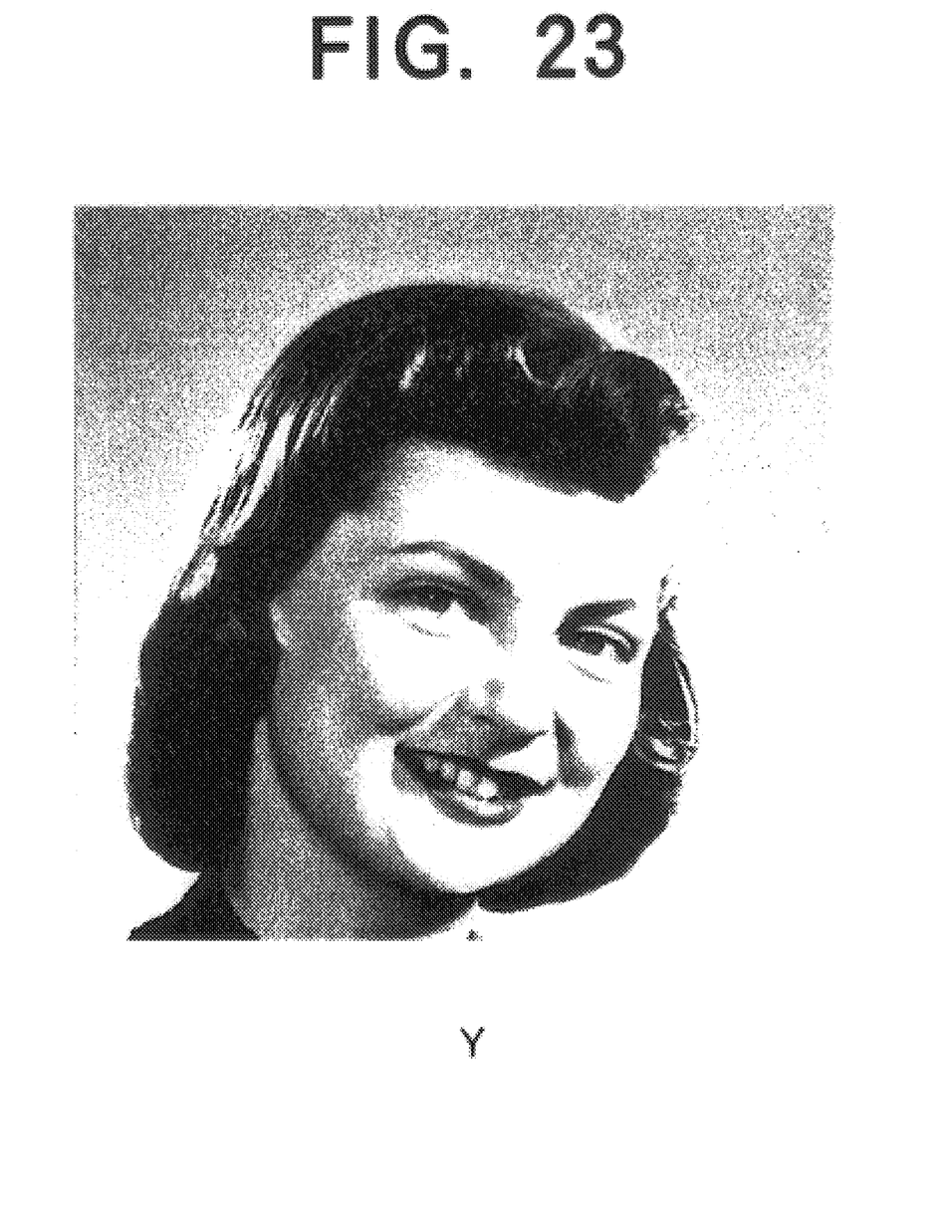
FIG. 23 is a converted image, obtained by the first embodiment by halving the resolution of the bi-level image in FIG. 21.

The result of the overall operation of the first embodiment is illustrated by FIGS. 21 to 23. FIG. 21 shows a bi-level image X having a resolution of six hundred dots per inch (600 DPI). FIG. 22 shows the rearranged image A produced by the density counter 4 and pattern converter 6, by rearranging dots according to the spiral patterns shown in FIGS. 2 to 16. FIG. 23 shows the converted image Y produced from this rearranged image A by the linear interpolator 8. The converted image Y has a resolution of three hundred dots per inch (300 DPI). Because of the regularity of the dot patterns in the rearranged image A, to the human eye, the converted image Y in FIG. 23 closely resembles the original image X in FIG. 21.

Figure 24:
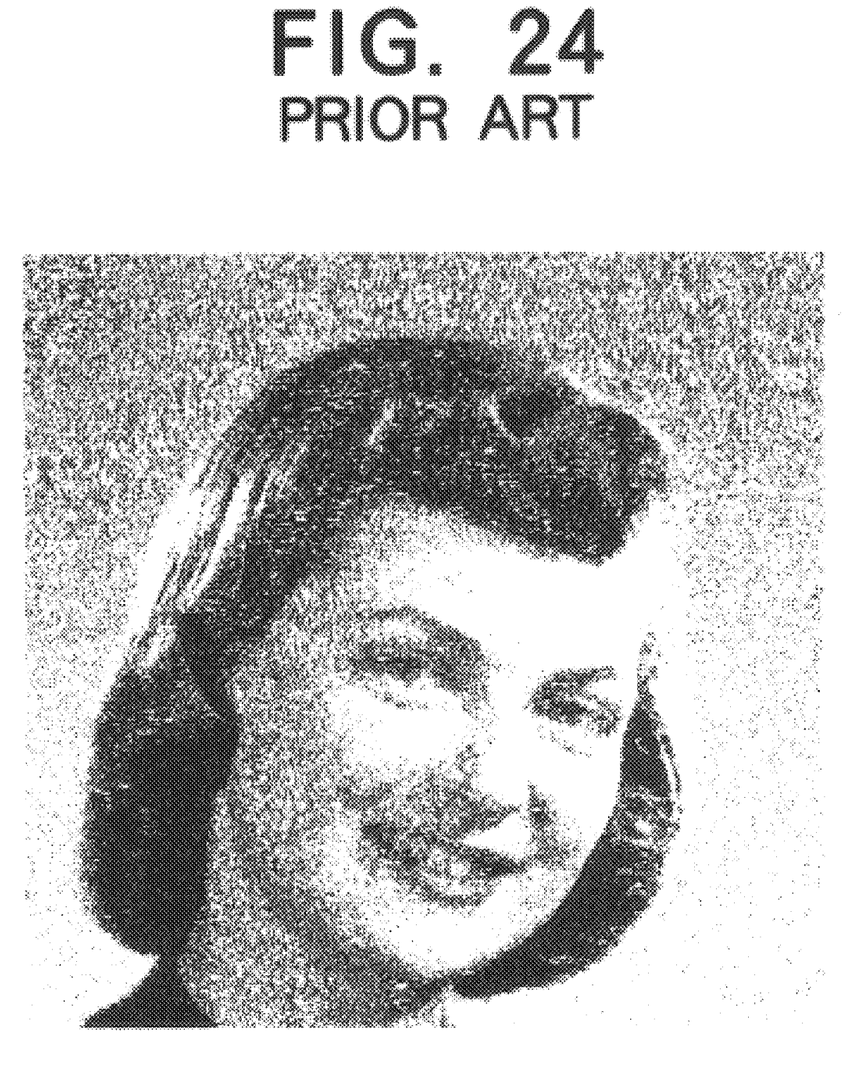
FIG. 24 is a conventional converted image, obtained by halving the resolution of the bi-level image in FIG. 21.

For comparison, FIG. 24 shows the result of converting the resolution of the image in FIG. 21 from six hundred dots per inch to three hundred dots per inch directly by linear interpolation, without rearrangement of the dots. The essentially random patterns of dots that generate different gray levels in FIG. 21 create much unwanted texture in FIG. 24. The image in FIG. 24 is obviously inferior in quality to the image generated by the first embodiment in FIG. 23.

Second Embodiment

The second embodiment is a bi-level image data compressor that compressively encodes a bi-level image. This embodiment can be usefully employed in a personal computer, for example, to compress image data to be sent to a printer, to avoid overflow of the printer's memory.

Figure 25:
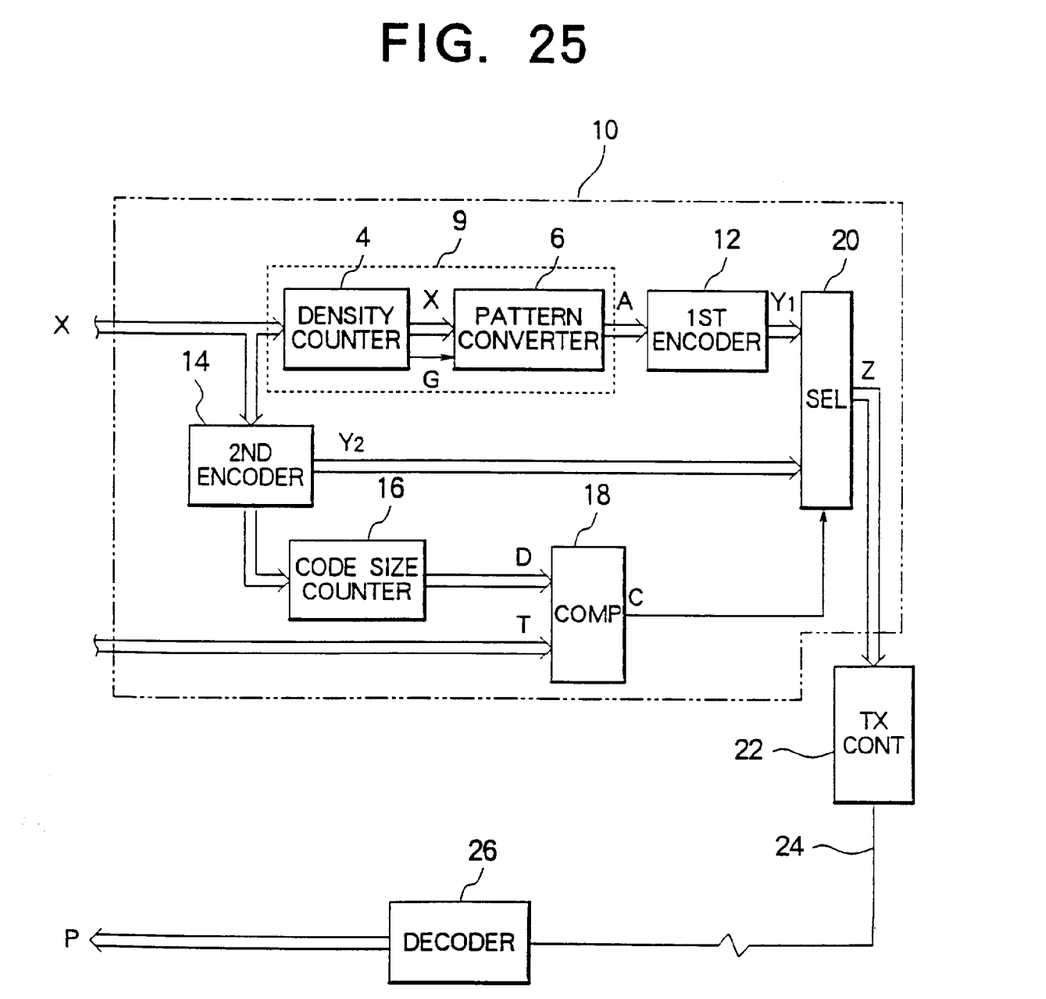
FIG. 25 is a block diagram of a second embodiment of the invention.

Referring to FIG. 25, the bi-level image data compressor 10 comprises an image regularizer 9, a first encoder 12 and second encoder 14, a code size counter 16, a comparator 18, and a selector 20. The image regularizer 9 is identical to the image regularizer 9 in the first embodiment, comprising a density counter 4 and pattern converter 6.

The input bi-level image X is received by both the image regularizer 9 and the second encoder 14. The first encoder 12 encodes the rearranged image A output by the pattern converter 6 by a lossless coding method, such as the modified modified READ (MMR) method, or an arithmetic coding method, thereby producing first coded data $Y_1$. The second encoder 14 encodes the input image X by the same method as employed in the first encoder 12, producing second coded data $Y_2$.

The code size counter 16 determines the size D of the second coded data $Y_2$, by counting bytes, for example. The comparator 18 compares this size D with a threshold value T, and outputs a signal C indicating whether D exceeds T. C is, for example, a one-bit signal with a value of '1' when D exceeds T and a value of '0' when D does not exceed T. The selector 20 receives the coded data $Y_1$, and $Y_2$ and this signal C, selects the first coded data $Y_1$ when signal C indicates that size D exceeds threshold T, and selects the second coded data $Y_2$ when D does not exceed T. The data selected by the selector 20 become the output data Z of the image data compressor 10.

These output data Z are transmitted by a data transmission controller 22 over a communication channel 24, such as an electrical cable or optical data link, to a decoder 26 in a device such as a printer. The decoder 26 stores the data Z in an internal buffer memory (not visible), and decodes the stored data to obtain a reproduced bi-level image P.

The threshold value T is set in relation to the size of the buffer memory used by the decoder 26. The size of this buffer memory is known to the personal computer or other host device in which the image data compressor 10 is installed. If the size of the buffer memory changes, e.g. when a new printer is connected, the host device alters the threshold T accordingly.

The operation of the second embodiment will now be described for a case in which the first and second encoders 12 and 14 employ arithmetic coding, and the threshold T is set at 0.1 megabyte. The input bi-level image X is the image shown in FIG. 21, which comprises 2048×2000 dots and has an uncompressed data size of 0.512 megabyte.

Arithmetic coding of image X by the second encoder 14 reduces the data size by a factor of 2.516; the size D of the second coded data $Y_2$ is 0.203 megabyte. Arithmetic coding of the rearranged image A (FIG. 22) reduces the data size by a larger factor of 4.742; the size of the first coded data $Y_1$ is only 0.147 megabyte. The increased compression ratio is due to the increased regularity of the rearranged data A. The rearranged data A tend to contain, for example, many consecutive occurrences of identical data patterns, which are readily compressed.

Figure 26:
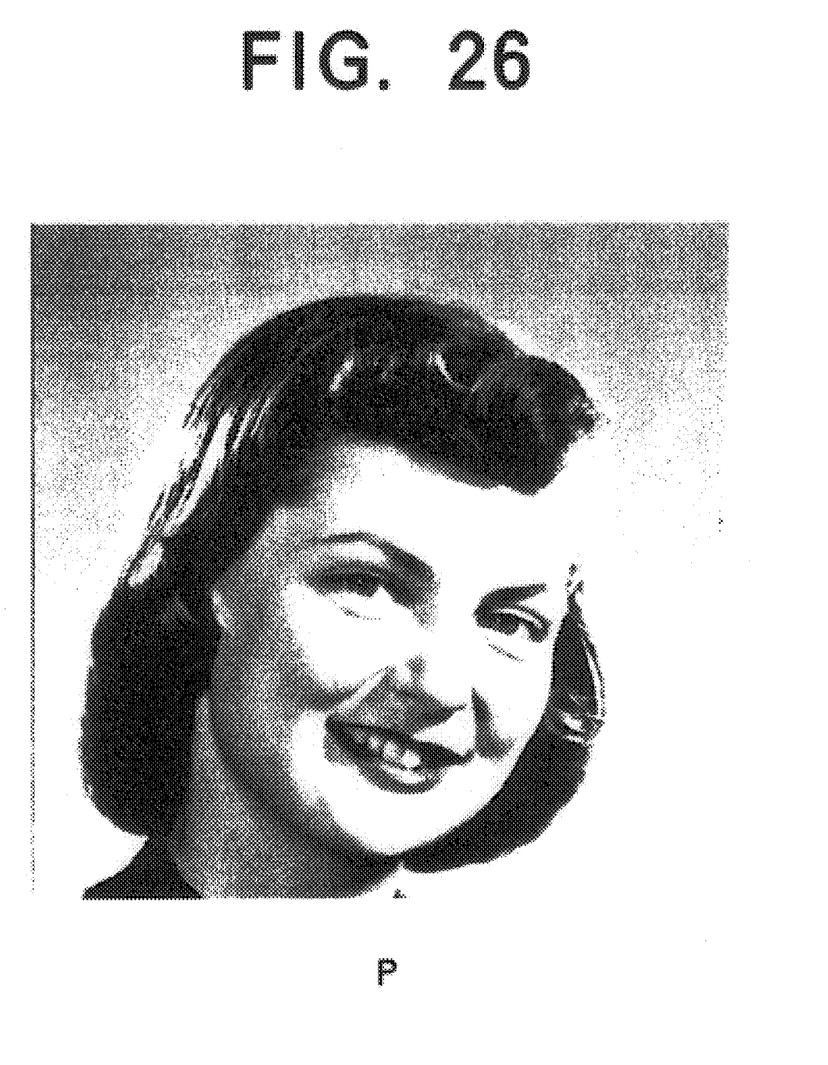
FIG. 26 is a decoded image obtained by the second embodiment.

Since the size D (0.203 megabyte) of the second coded data $Y_2$ exceeds the threshold value T (0.1 megabyte), the comparator 18 outputs a signal C instructing the selector 20 to select the first coded data $Y_1$ as the output data Z. The data transmission controller 22 sends the output data Z to the decoder 26. The decoder 26 performs a lossless arithmetic decoding process, so the decoded bi-level image P, shown in FIG. 26, is identical to the rearranged image A.

When the size D does not exceed the threshold T, the second coded data $Y_2$ are selected, and lossless decoding by the decoder 26 produces a decoded image P directly from the encoded original image X. This is, of course, the most desirable situation, but when insufficient memory prevents the decoder 26 from receiving the entire second coded data $Y_2$, by substituting the rearranged image A for the original image X, the second embodiment enables the decoder 26 to produce a satisfactory decoded image. The second embodiment thereby avoids the problem of buffer memory overflow, which would lead to an incomplete and hence unacceptable decoded image.

The present invention is not restricted to the embodiments above. It is not necessary for the pattern converter 6 to generate spiral dot patterns; various other types of regular patterns can be employed. It is not necessary for the rectangular blocks to be four-by-four blocks; M×N blocks may be employed, where M and N are any integers greater than unity. It is not necessary for M to be equal to N. The value of G can be obtained from a look-up table, instead of by counting. The dots need not be black and white. The image regularizer can be used to regularize bi-level image data for purposes other than resolution conversion and data compression.

Those skilled in the art will recognize that other variations are possible within the scope of the invention as claimed below.

What is claimed is:

1. An image processing apparatus for processing a bi-level image formed by dots having a first value and dots having a second value, comprising:

an image regularizer dividing said bi-level image into rectangular blocks of a predetermined number of dot locations, counting the number of dots having the first value in each rectangular block among said rectangular blocks, rearranging the dots in said rectangular block into a predetermined pattern determined by the number of dots having said first value in said rectangular block, thereby producing a rearranged image, wherein said predetermined pattern is a spiral pattern beginning at a central dot location in said rectangular block, the number of dots having the first value in said spiral pattern is the same as the number of dots having the first value in said rectangular block before the dots are rearranged, and the number of dots having the second value in said spiral pattern is the same as the number of dots having the second value in said rectangular block before the dots are rearranged.

2. The apparatus of claim 1, wherein said image regularizer comprises:

a density counter for counting the dots having said first value in each of said rectangular blocks, thereby obtaining a density count for each of said rectangular blocks; and a pattern converter coupled to said density counter, for regularly rearranging the dots in each said rectangular block, responsive to said density count, thereby producing said rearranged image.

3. The apparatus of claim 1, further comprising a resolution converter for converting said rearranged image from a first resolution to a second resolution.

4. The apparatus of claim 3, wherein said resolution converter is a linear interpolator.

5. The apparatus of claim 1, further comprising a first encoder for compressively encoding said rearranged image, thereby obtaining first coded data.

6. The apparatus of claim 5, wherein said first coded data are used as output data of said apparatus.

7. The apparatus of claim 1, further comprising:

an image size reducer, coupled to said image regularizer, for reducing said rearranged image in size.

8. An image processing apparatus for processing a bi-level image formed by dots having a first value and dots having a second value, comprising:

an image regularizer dividing said bi-level image into rectangular blocks of a predetermined number of dot locations, and in each of said rectangular blocks, rearranging the dots into a predetermined pattern determined by how many dots have said first value in said rectangular block, thereby producing a rearranged image;

a first encoder for compressively encoding said rearranged image, thereby obtaining first coded data;

a second encoder for compressively encoding said bilevel image, thereby obtaining second coded data;

a code size counter coupled to said second encoder, for determining a size of said second coded data;

a comparator coupled to said code size counter, for comparing said size with a threshold value; and a selector coupled to said comparator, for selecting said first coded data when said size exceeds said threshold value, and selecting said second coded data when said size does not exceed said threshold value, the coded data selected by said selector being used as output data of said apparatus.

9. A method of converting a bi-level image, formed by dots having a first value and dots having a second value, from a first resolution to a second resolution, comprising the steps of:

dividing said bi-level image into rectangular blocks of a predetermined number of dot locations;

counting the dots having said first value in each of said rectangular blocks, thereby obtaining a density count for each of said rectangular blocks;

rearranging the dots in each rectangular block into a predetermined pattern determined by the density count of said rectangular block, thereby generating a rearranged image having said first resolution, wherein said predetermined pattern is a spiral pattern beginning at a central dot location in said rectangular block, the number of dots having the first value in said spiral pattern is the same as the number of dots having the first value in said rectangular block before the dots are rearranged, and the number of dots having the second value in said spiral pattern is the same as the number of dots having the second value in said rectangular block before the dots are rearranged; and converting said rearranged image from said first resolution to said second resolution.

* * * * *